(12) United States Patent
Fishlock et al.

(10) Patent No.: US 6,466,720 B1
(45) Date of Patent: Oct. 15, 2002

(54) OPTICAL FIBRE CABLE MANUFACTURE

(75) Inventors: Nigel Earl Fishlock; Nigel Shackleton; Anthony Brown, all of South Wales (GB)

(73) Assignee: Pirelli General PLC, London (GB)

( * ) Notice: Subject to any disclaimer, the term of this patent is extended or adjusted under 35 U.S.C. 154(b) by 0 days.

(21) Appl. No.: 09/450,440

(22) Filed: Nov. 30, 1999

(30) Foreign Application Priority Data

Nov. 30, 1998 (GB) ................................ 9826263

(51) Int. Cl.$^7$ ........................... G02B 6/44; B29D 11/00
(52) U.S. Cl. .................. 385/112; 385/109; 264/1.28; 264/1.29
(58) Field of Search .................... 385/100, 102, 385/103, 106, 109, 112; 264/1.24, 1.28, 1.29

(56) References Cited

U.S. PATENT DOCUMENTS 5,188,883 A * 2/1993 Rawlyk ...................... 428/189
5,759,454 A 6/1998 Le Gac et al.
6,195,486 B1 * 2/2001 Field et al. .................. 385/100
6,330,385 B1 * 12/2001 Sheu .......................... 385/100

FOREIGN PATENT DOCUMENTS

| EP | 564 993 | 10/1993 | |
| EP | 0564993 A1 * | 10/1993 | G02B/6/44 |
| GB | 2 172 410 | 9/1986 | |
| GB | 2172410 A * | 9/1986 | G02B/6/44 |
| GB | 2 193 006 | 1/1998 | |

* cited by examiner

*Primary Examiner*—Hemang Sanghavi
*Assistant Examiner*—Omar Rojas
(74) *Attorney, Agent, or Firm*—Finnegan, Henderson, Farabow, Garrett & Dunner, LLP

(57) ABSTRACT

In a method of manufacturing an optical fiber cable comprising optical fiber units 12 disposed within an extruded sheath 14 with water absorbent powder 16 being provided between the optical fiber unit or units and the sheath, the fiber units pass through an extruder cross-head 36 extruding said sheath 14 together with a tape 22 transporting the water absorbent powder 16. The tape is formed upstream of said extruder crosshead 36 into a channel into which said water absorbent powder is delivered and the tape is adhered to the inside surface 24 of said sheath 14 by fusion thereto.

13 Claims, 2 Drawing Sheets

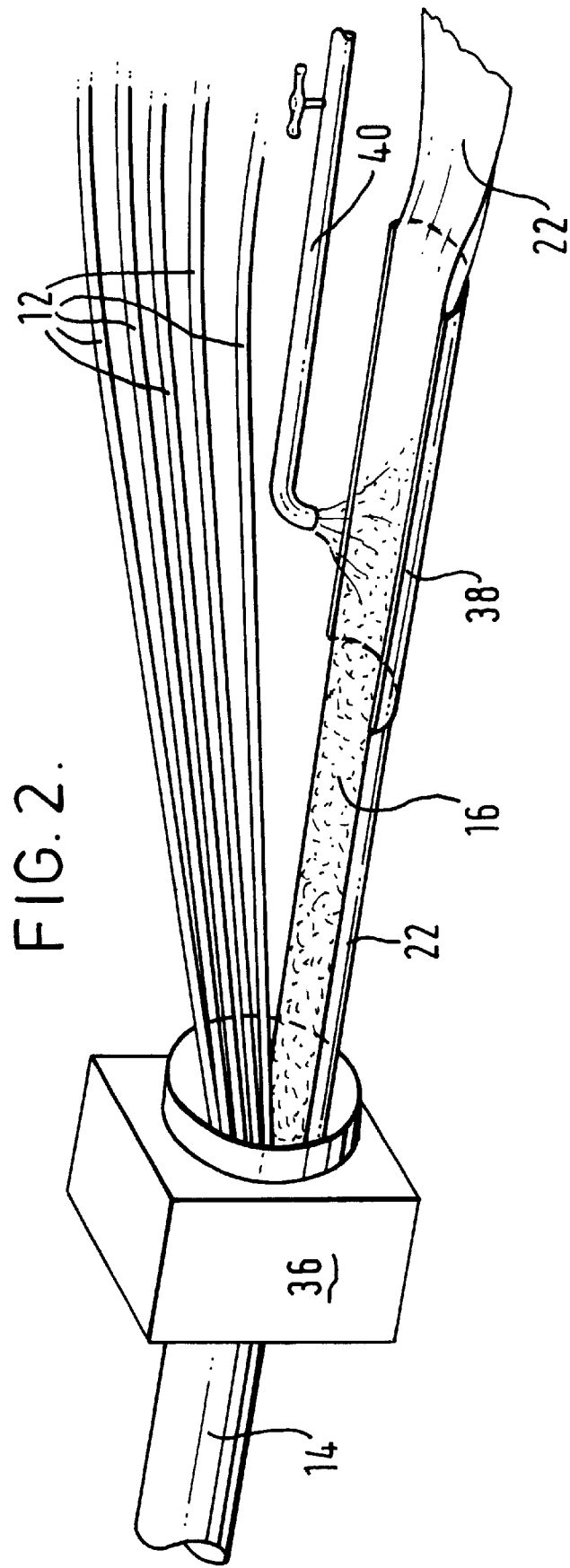

OPTICAL FIBRE CABLE MANUFACTURE

BACKGROUND OF THE INVENTION

This invention relates to optical fibre cable manufacture and more particularly to a method of manufacturing an optical fibre cable comprising at least one optical fibre unit disposed within an extruded sheath with water absorbent powder being provided between the optical fibre unit or units and the sheath.

Such cables are known where the water absorbent powder is provided to prevent longitudinal water migration within the sheath. In the manufacture of these cables the water absorbent powder is provided within the sheath by being metered directly into the extruder cross-head and/or transported on the optical fibre units by electrostatic attraction thereto. In order to improve the degree of water migration prevention, for example to prevent transverse water migration as well as longitudinal water migration, there is a need to provide more water absorbing powder within the sheath than generally achievable by these known techniques.

SUMMARY OF THE INVENTION

The present invention provides a method of manufacturing an optical fibre cable comprising at least one optical fibre unit disposed within an extruded sheath with water absorbent powder being provided between the optical fibre unit or units and the sheath, in which method said at least one fibre unit passes through an extruder cross-head extruding said sheath together with a tape transporting the water absorbent powder, the tape being formed upstream of said extruder crosshead into a channel into which said water absorbent powder is delivered.

The invention also includes an optical fibre cable when made by a method as defined in the last preceding paragraph.

The tape may be adhered to the inside surface of the sheath and in this case preferably the tape is adhered to the inside surface of said sheath by fusion thereto.

To this end, preferably the material of the tape adjacent the inside surface of the sheath has a fusion temperature below that of the temperature of the extrusion material in the extrusion cross-head.

The tape may be a laminate of at least two layers, the material of the layer adjacent the inner surface of the sheath having a fusion temperature below that of the temperature of the extrusion material in the extrusion cross-head and the material of the, or at least one, other layer having a fusion temperature above that of the temperature of the extrusion material in the extrusion cross-head.

In a presently preferred embodiment, the tape is a laminate of two layers, the material of the layer adjacent the inner surface of the sheath being a polyethylene copolymer. In this embodiment the material of the other layer is a polyester. Furthermore, in this embodiment the extrusion material is a medium density polyethylene.

Preferably, the channel is arcuate in transverse cross-section with substantially the same radius of curvature as the inside surface of the sheath.

In the above-mentioned embodiment, the channel is substantially semi-circular in transverse cross-section.

In carrying out the method, the rate of delivery of water absorbent powder into the channel is preferably controlled depending on the space between the sheath and the fibre unit or units in the cable design and the rate of extrusion of the sheath. It is to be noted that said at least one fibre unit of the cable may comprise a plurality of optical fibres disposed within a tube. It is to be understood, however, that the fibre unit may take other forms. For example, said at least one fibre unit may comprise a single optical fibre provided with a protective coating, or a ribbon of optical fibres, which may be disposed within a tube.

The invention also includes an optical fibre cable comprising at least one optical fibre unit disposed within an extruded sheath with water absorbent powder provided between the optical fibre unit or units and the sheath, wherein a longitudinally extending tape is disposed adjacent the inside surface of the sheath over only a portion of the peripheral extent thereof.

BRIEF DESCRIPTION OF THE DRAWINGS

In order that the invention may be well understood the above-mentioned embodiment thereof, which is given by way of example only, will now be described with reference to the accompanying drawings, in which:

FIG. 2 schematically illustrates a step in the manufacture of the same optical fibre cable.

DETAILED DESCRIPTION OF THE PREFERRED EMBODIMENTS

Figure 1:
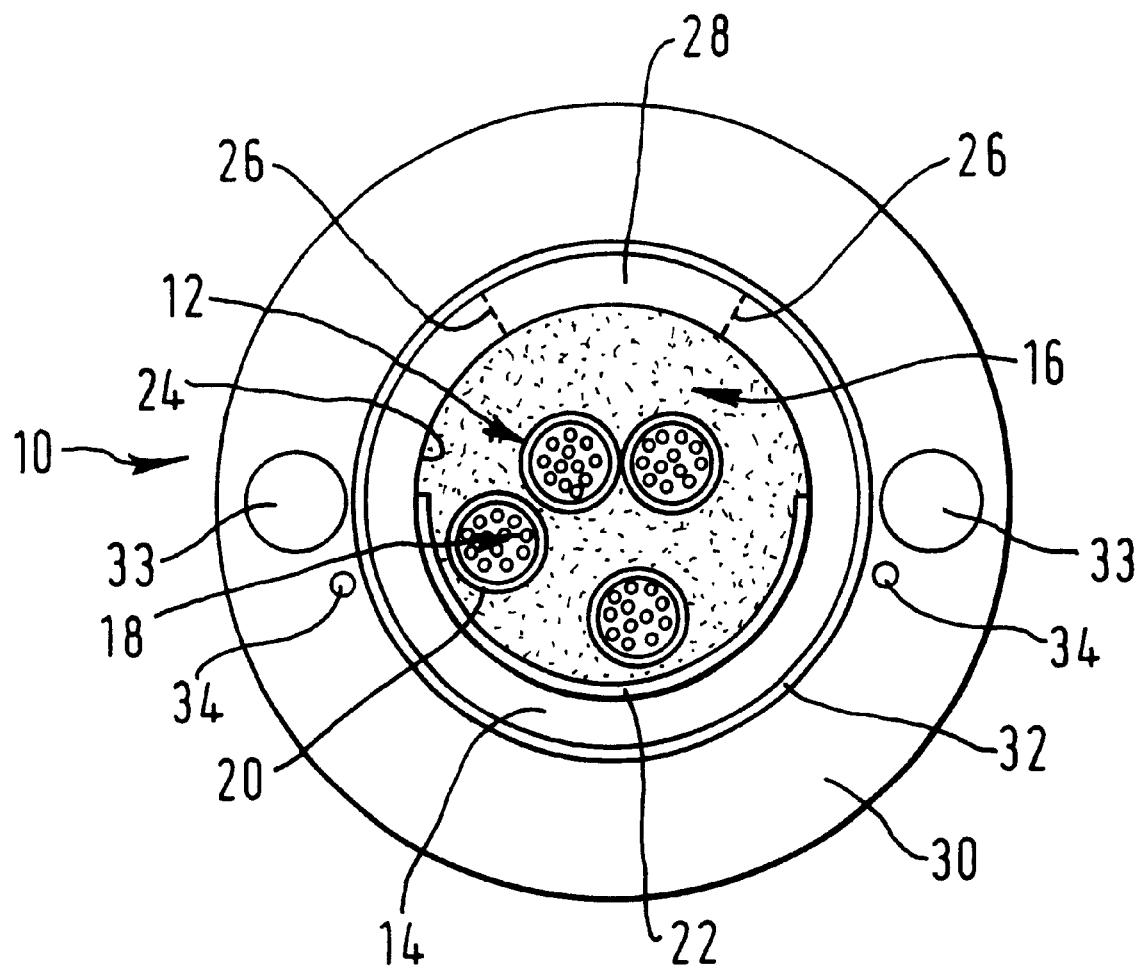
FIG. 1 is a schematic cross-section of an optical fibre cable.

Referring first to FIG. 1, there is shown an optical fibre cable 10 which comprises at lest one optical fibre unit 12 disposed within an extruded sheath 14. As illustrated, four such units 12 are provided. Water absorbent powder 16 is provided in the otherwise empty spaces between the sheath 14 and the units 12. Each unit 12 comprises a plurality of coated optical fibres 18, for example twelve, disposed within a tube 20. The tubes 20 may be formed of a polyvinylchloride and are advantageously of different colours or colour combinations for identification purposes.

The water absorbent powder is capable of absorbing large quantities of water whilst maintaining a degree of insolubility. It may be formed from a natural material such as guar gum, xanthan gum or chitin or it may be formed from a synthetic material such as polymers of acrylic acid, acrylate esters, vinyl alcohol, ethylene oxide or acrylamide with subsequent cross-linking. Suitable powders are marketed under the Trade Name 'Firet'.

A longitudinally extending tape 22 is disposed adjacent the inside surface 24 of the sheath 14 over only a portion of the peripheral extent thereof. This tape forms a channel for transporting the water absorbent powder 16 through the extruder cross-head together with the units 12 during manufacture as will be described in more detail hereinafter.

The sheath 14 includes peripherally spaced weakened portions 26 facilitating removal of the portion 28 therebetween to provide access to the units 12. As shown this portion 28 is off-set from the tape 22.

The sheath 14, which is typically formed from a medium density polyethylene material, is surrounded by an outer sheath 30 of a high density polyethylene material extruded thereonto with a paper taping 32 therebetween preventing adherence of the outer sheath 30 to the sheath 14 during extrusion of the outer sheath. Embedded within the outer sheath 30 are diametrically opposed tensile strength members 33, for example of glass reinforced plastic, and rip cords 34. As will be appreciated the rip cords and the paper taping facilitate removal of the other sheath 30 to provide access to the portion 28 of the sheath 14.

Referring now to FIG. 2, in the manufacture of the cable 10, the fibre units 12 supplied from respective bobbins (not shown) are passed through an extruder cross-head 36 extruding the sheath 14 together with the tape 22 which transports the powder 16. The tape 22 is supplied from a reel (not shown) and formed upstream of the extruder cross-head 36 into a channel into which the powder is delivered.

The tape 22 is formed into this channel by passing it over a channel-shaped former 38. The downstream end of the former 38, and thus the channel formed by the tape, is arcuate in transverse cross-section with substantially the same radius of curvature as the inside surface of the sheath 14. As illustrated, the channel is substantially semi-circular in transverse cross-section and extends over about half of the peripheral extent of the inside surface of the sheath. However, this is not critical and the channel may extend over only, say, a quarter of the peripheral extent of the inside of the sheath or as much as, say, three quarters of this extent.

The powder 16 is delivered, or supplied, from a source thereof (not shown) to the channel formed by the tape via a metering device 40 which is adjustable to alter the rate of delivery of powder 16 to the tape depending on the volume of the space between the sheath 14 and the units 20 and the rate of extrusion of the sheath.

In order to prevent the tape 22 within the sheath 14 damaging the fibre units 20 during handling of the cable it is adhered to the inside surface of the sheath. More particularly, in accordance with an advantageous aspect of the method, the tape 22 is adhered to the inside surface of the sheath by fusion thereto. This is achieved automatically during the manufacturing step illustrated in FIG. 2 since the material of the tape adjacent the inner surface of the sheath has a fusion temperature below that of the temperature of the medium density polyethylene extrusion material in the cross-head. More particularly, the tape 22 is a laminate of at least two layers, the material of the layer adjacent the inner surface of the sheath having a fusion temperature below that of the temperature of the extrusion material in the cross-head and the material of the, or at least one, other layer of the tape having a fusion temperature above that of the temperature of the extrusion material in the cross-head. By this arrangement the last mentioned layer or layers provide sufficient tensile strength to the tape to prevent breakage thereof under back tension when the tape is passing through the extruder cross-head whilst the first mentioned layer is able to fuse to the inside surface of the sheath.

In the embodiment the tape 22 is a laminate of two layers. The material of the layer adjacent the inside surface of the sheath is a polyethylene copolymer having a fusion temperature of about 150° C.—about 50° C. lower than the temperature of the medium density polyethylene in the cross-head and the material of the other layer is a polyester.

In the embodiment, the inside diameter of the sheath 14 is about 6 mm and the tape 22 has a width of 10 to 12 mm (and therefore extends just over half the peripheral extent of the inside surface of the sheath) and a thickness of 20 $\mu$m formed by two layers of substantially equal thickness.

From the foregoing it will be appreciated that the use of the tape 22 to transport the water absorbent powder 16 provides an efficient way of providing this powder between the sheath 14 and the units 12.

What is claimed is:

1. A method of manufacturing an optical fibre cable comprising at least one optical fibre unit disposed within an extruded sheath with water absorbent powder being provided between the optical fibre unit or units and the sheath, in which method said at least one fibre unit passes through an extruder cross-head extruding said sheath together with a tape transporting the water absorbent powder, the tape being formed upstream of said extruder crosshead into a channel into which said water absorbent powder is delivered, wherein said method provides the water absorbent powder in the otherwise empty spaces between the sheath and the said at least one optical fibre unit.

2. A method as claimed in claim 1 wherein said tape is adhered to the inside surface of said sheath.

3. A method as claimed in claim 2, wherein the tape is adhered to the inside surface of said sheath by fusion thereto.

4. A method as claimed in claim 3, wherein the material of the tape adjacent the inside surface of the sheath has a fusion temperature below that of the temperature of the extrusion material in the extrusion cross-head.

5. A method as claimed in claim 3, wherein the tape is a laminate of at least two layers, the material of the layer adjacent the inner surface of the sheath having a fusion temperature below that of the temperature of the extrusion material in the extrusion cross-head and the material of the, or at least one, other layer having a fusion temperature above that of the temperature of the extrusion material in the extrusion cross-head.

6. A method as claimed in claim 5, wherein the tape is a laminate of two layers, the material of the layer adjacent the inner surface of the sheath being a polyethylene copolymer.

7. A method as claimed in claim 6, wherein the material of the other layer is a polyester.

8. A method as claimed in claim 5, wherein the extrusion material is a medium density polyethylene.

9. A method as claimed in claim 1 wherein the channel is arcuate in transverse cross-section with substantially the same radius of curvature as the inside surface of the sheath.

10. A method as claimed in claim 9, wherein the channel is substantially semi-circular in transverse cross-section.

11. A method as claimed in claim 1 wherein the rate of delivery of water absorbent powder into said channel is controlled.

12. A method as claimed in claim 1 wherein said at least one fibre unit comprises a plurality of optical fibres disposed within a tube.

13. An optical fibre cable when made by a method as claimed in claim 1.

* * * * *